United States Patent
Rottmann

(10) Patent No.: US 8,152,047 B2
(45) Date of Patent: Apr. 10, 2012

(54) METHOD OF PRODUCING A CORROSION RESISTANT ALUMINUM HEAT EXCHANGER

(75) Inventor: Edward G. Rottmann, Bowling Green, KY (US)

(73) Assignee: Luvata Franklin, Inc., Franklin, KY (US)

(*) Notice: Subject to any disclaimer, the term of this patent is extended or adjusted under 35 U.S.C. 154(b) by 1027 days.

(21) Appl. No.: 12/104,070

(22) Filed: Apr. 16, 2008

(65) Prior Publication Data
US 2008/0257533 A1  Oct. 23, 2008

Related U.S. Application Data

(60) Provisional application No. 60/912,034, filed on Apr. 16, 2007.

(51) Int. Cl.
B23K 31/02 (2006.01)
F28F 9/04 (2006.01)
(52) U.S. Cl. ........ 228/183; 29/890.03; 165/178
(58) Field of Classification Search ........ 165/178, 165/134.1, 133; 228/183, 194, 208, 262.45, 228/262.31, 262.61, 262.9; 285/47, 48, 50, 285/148.11, 148.12
See application file for complete search history.

(56) References Cited

U.S. PATENT DOCUMENTS

| | | | |
|---|---|---|---|
| 2,745,797 A * | 5/1956 | Long | 205/114 |
| 2,823,933 A * | 2/1958 | Hickman et al. | 285/148.12 |
| 2,868,863 A * | 1/1959 | Cook | 174/94 R |
| 3,040,427 A * | 6/1962 | Howell | 228/131 |
| 3,042,428 A * | 7/1962 | Gardiner | 285/148.12 |
| 3,455,014 A * | 7/1969 | Beyer | 29/460 |
| 3,671,406 A * | 6/1972 | Mattia et al. | 205/114 |
| 3,833,986 A | 9/1974 | DeCicco | |
| 4,186,474 A | 2/1980 | Hine | |
| 4,693,501 A * | 9/1987 | Logsdon et al. | 285/148.12 |
| 4,773,476 A | 9/1988 | Baehrle et al. | |
| 4,831,701 A | 5/1989 | Yutaka | |
| 5,005,285 A | 4/1991 | Ishii | |
| 5,429,183 A * | 7/1995 | Hisamori et al. | 165/134.1 |
| 5,765,393 A | 6/1998 | Shlak et al. | |
| 6,325,138 B1 | 12/2001 | Garosshen et al. | |
| 6,578,628 B1 | 6/2003 | Garosshen | |
| 6,886,349 B1 | 5/2005 | Curicuta et al. | |
| 6,948,455 B2 | 9/2005 | Ferguson et al. | |
| 2005/0150250 A1 | 7/2005 | Allison et al. | |
| 2005/0155750 A1 | 7/2005 | Mitchell et al. | |
| 2007/0163767 A1 | 7/2007 | Mitchell et al. | |

FOREIGN PATENT DOCUMENTS
EP    0859209 A1    8/1998
* cited by examiner

Primary Examiner — Tho V Duong
(74) Attorney, Agent, or Firm — Hodgson Russ LLP

(57) ABSTRACT

An aluminum heat exchanger having increased resistance to galvanic corrosion. The exterior of one end of the aluminum tube or connector is coated with a metal or metal alloy. This end is brazed onto a copper or copper alloy inlet or outlet tube. The metal or metal alloy coating inhibits the formation of galvanic corrosion.

11 Claims, 1 Drawing Sheet

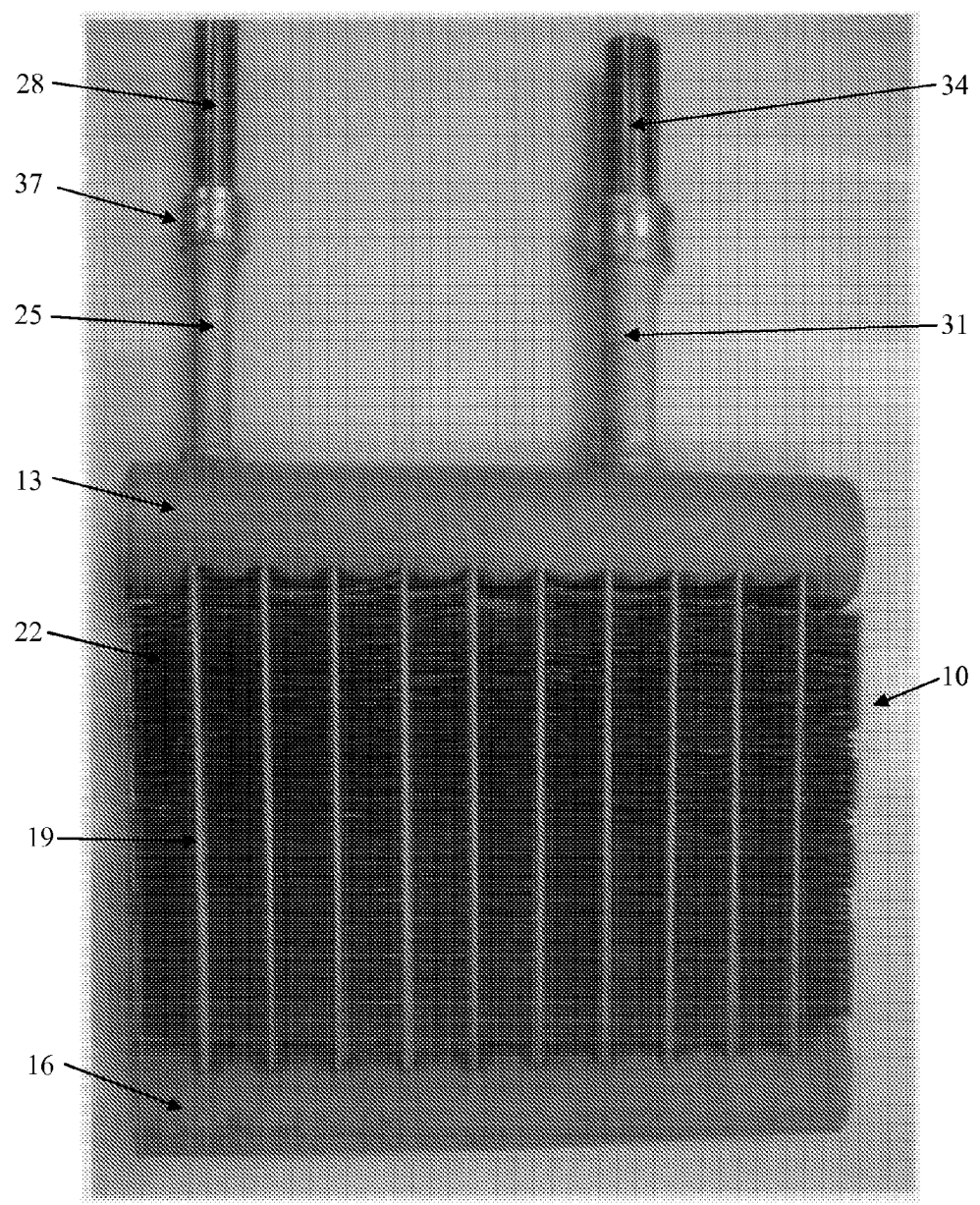

METHOD OF PRODUCING A CORROSION RESISTANT ALUMINUM HEAT EXCHANGER

CROSS-REFERENCE TO RELATED APPLICATION

Applicant hereby claims priority based on U.S. Provisional Patent Application No. 60/912,034 filed Apr. 16, 2007, and entitled "Method of Producing a Corrosion Resistant Aluminum Heat Exchanger," which is incorporated herein by reference.

FIELD OF THE INVENTION

The present invention relates to heat exchangers made from aluminum, and more particularly to a method for treating aluminum heat exchanger hair-pin tubes, straight tubes, or connectors for attachment to copper tubes.

BACKGROUND OF THE INVENTION

Copper-aluminum heat exchangers may comprise aluminum plate-fins stacked in parallel with a plurality of aluminum hair-pin tubing sections going through the plate-fins. The aluminum heat exchanger is connected to copper inlet and outlet tubes. Typically, the aluminum heat exchanger is connected to copper inlet and outlet tubes by connector or extension tubes. In the heat exchanger industry, these are also called stub-out tubes. The copper inlet and outlet tubes carry the refrigerant to and from the heat exchanger.

Plate-fin and tube heat exchangers are used in a wide variety of applications including, but not limited to, air conditioning and refrigeration where it is desired to exchange heat between two fluids, usually a pure liquid or a liquid undergoing a phase change to or from a gas, flowing in the heat exchanger tubes and gas, usually air, flowing around the heat exchanger plate-fins and tube exteriors.

In such a heat exchanger, a plurality of thin plate-fins are arranged parallel to each other between two tube sheets. Heat exchanger tubes pass through holes in the tube sheets and plate-fins. There is a firm fit between the tubes and the plate-fins so that the effective surface area, and thus the heat transfer area, of the heat exchanger tubes is increased by the area of the plate fins. Because of this increase in surface area, a plate fin and tube heat exchanger offers improved heat transfer performance over a plain tube type heat exchanger of the same size.

A common method of manufacturing this type of heat exchanger is to first assemble a plurality of plate-fins between two tube sheets, then lace a plurality of hair pin tubes through selected holes in the plate-fins and similar holes in each of the tube sheets. Next, bells are formed in the end of hairpin tubes, then the legs of the tubes are expanded to insure a tight mechanical fit between the tubes and plate-fins.

Currently there are difficulties in joining aluminum tubes to copper inlet and outlet tubes. In order for the heat exchanger to function properly, the joint between the aluminum connector and the copper inlet tube must hold refrigerant at high operating pressures. Furthermore, the joint must be capable of holding for many years while operating at pressures that are multiplied by a safety factor. Additionally, the joint must also hold these pressures in an environment that subjects the joint to large amounts of cyclic stresses resulting from mechanical and thermal loading.

In response to these challenges, manufacturers of heat exchangers have developed mechanical joints and other methods in an attempt to provide heat exchangers with a tight fit that is suitable for long-term use. There are several methods for joining the aluminum tube to the copper tube. For example, joining the two tubes can be done by soldering or brazing. To date, these methods have proven to be inadequate.

Another problem with copper-to-aluminum joints is the tendency for galvanic corrosion. This problem is magnified if the brazing alloy used to braze the aluminum and copper does not completely fill the joint. This is a common problem in brazing joints.

Galvanic corrosion occurs when two dissimilar metals make contact with one another in the presence of an electrolyte, such as water, thereby forming a galvanic couple. The mere presence of an electrolyte will allow for galvanic corrosion to occur when the base materials are in close proximity, even when they are not in direct contact. The more noble metal (i.e., the more cathodic on the galvanic series) provides additional surface area for a reduction reaction to occur on. This reaction accelerates the oxidation/corrosion of the less noble metal (more anodic on the galvanic series). The extent of the corrosion is greatest at the interface of the two metals, but may also occur at some distance away from the actual interface.

Heat exchangers made of copper tubes and aluminum fins have a corrosion durability that is about ten times lower than heat exchangers made with aluminum fins and aluminum tubes. As explained above, when two dissimilar metals are in contact with each other in a corrosive environment, a galvanic couple forms and the more noble metal promotes the corrosion of the more active metal. In the case of heat exchangers having copper tubes and aluminum fins, the copper is the more noble metal, while the aluminum is more active.

The adverse role of the more noble metal, copper, is that: (1) it provides additional surface area for the reduction reaction of the corrosion process to occur on, and (2) corrosion reduction rates are very high on copper. These two factors accelerate the corrosion process, resulting in a ten-fold increase in the corrosion rate of the aluminum fins.

There are several methods for preventing galvanic corrosion. One method involves coating the exposed surface of the metal with various types of paint. Another method of protecting the heat exchanger core involves coating it with a flux containing zinc chloride ($ZnCl_2$). Yet another method involves aluminizing the copper. All of the above methods to prevent galvanic corrosion have provided limited success.

SUMMARY OF THE INVENTION

The present invention meets the above-described need by providing a method for producing a corrosion resistant aluminum heat exchanger. The exterior or interior of the aluminum tube or aluminum connector tube is partially coated with a metal or alloy having a high solidus temperature.

BRIEF DESCRIPTION OF THE DRAWINGS

FIG. 1 depicts an aluminum heat exchanger having a copper to aluminum joint.

DETAILED DESCRIPTION OF THE PRESENT INVENTION

The present invention provides an aluminum or aluminum alloy heat exchanger with improved resistance to galvanic corrosion. This objective is achieved by having a coating on the exterior of any aluminum tube, connector, or piece that is connected to a copper or copper alloy tube.

This improved resistance to galvanic corrosion can be realized by almost any aluminum or aluminum alloy heat exchanger. Aluminum plate-fin, fin-less, or microchannel heat exchangers can take advantage of the benefits of this invention.

In one embodiment, the present invention provides an aluminum or aluminum alloy exchanger. In one embodiment, the heat-exchanger is a copper-aluminum fin and tube heat exchanger. In a preferred embodiment, the plate-fins and interlacing hair-pin tubes are made of aluminum. Copper inlet and outlet tubes, which are connected to the aluminum hair-pin tubes directly or through aluminum connector stubs at each end of the heat exchanger, supply the refrigerant to and from the heat exchanger.

Turning to FIG. 1, a heat exchanger 10 has a first header 13 and a second header 16. A plurality of heat exchanger tubes 19 extend between the headers. A plurality of fins 22 are disposed adjacent to the tubes. A first connector 25 is attached to the header 13. The first connector 25 attaches to the inlet tubing 28 that conveys the refrigerant to the heat exchanger 10. A second connector 31 attaches to the outlet tubing 34. The coating 37 of the present invention may be used at the junction between the connectors 25, 31 which may comprise aluminum or aluminum alloy and the tubing 28 and 34 which may comprise copper or copper alloy.

According to the above embodiment of the present invention, an aluminum hair-pin tube of various lengths is provided. The tube length depends on the particular heat exchanger application. An aluminum connector is also provided. The exterior of the aluminum hair-pin tube or aluminum connector is partially coated at one end with a metal or alloy having a high solidus temperature. The partially coated aluminum hair-pin tube or aluminum connector is then brazed to the metal heat exchanger by joining the uncoated end to the heat exchanger in a brazing furnace using a standard brazing material and flux to join the heat exchanger. In the brazing furnace the partially coated aluminum hair-pin tube or aluminum connector is then joined to the header and fins to generate a functional heat exchanger.

In one embodiment of the present invention, the partially coated aluminum tube or aluminum connector is joined to the heat exchanger in a separate operation, following the furnace brazing of the other heat exchanger components. In a preferred method of the present invention, the partially coated aluminum tube or aluminum connector is joined or brazed to the heat exchanger at the same time as the other heat exchanger components are brazed. Once joined to the heat exchanger, the partially coated end of the aluminum tube or aluminum connector is then exposed and can be field joined to the copper inlet or outlet conduit using standard brazing or soldering methods.

In another embodiment, a finless aluminum or aluminum alloy heat-exchanger is provided. The heat-exchanger is comprised of aluminum tubes, along with a copper inlet tube and a copper outlet tube. Typically, the aluminum tubes are connected to the copper inlet and/or copper outlet tube by an aluminum connector. The aluminum tube or aluminum connector is partially coated with a metal or metal alloy having a high solidus temperature. This partially coated aluminum piece is then connected to a copper inlet or outlet tube by standard brazing techniques.

In another embodiment, an aluminum or aluminum alloy microchannel heat exchanger is provided. The aluminum microchannel heat exchanger coil is comprised of multiple flat aluminum tubes. Each aluminum tube contains channels for the refrigerant to flow through. Aluminum fins are situated between the layers of aluminum tubes. All of the aluminum tubes are attached to an aluminum header. A copper inlet provides refrigerant to the header. The refrigerant circulates through the aluminum tubes and then returns to the header exiting the heat exchanger via a copper outlet tube.

In this embodiment of the present invention; a connector tube connects the aluminum header to the copper inlet and/or outlet tube. This connector tube is partially coated on one end with a metal or metal alloy having a high solidus temperature. The partially coated end is connected to the copper inlet or outlet tube by standard brazing techniques.

In one embodiment of the present invention, the metal for coating the aluminum tube or connector is nickel or nickel alloy. However, other metals or alloys can be used if the metal or alloy has a higher solidus temperature than the temperature required during the furnace brazing process and also has the right chemical properties to inhibit the galvanic corrosion. Chromium or chromium alloy is another example of a suitable coating. By selecting a metal or alloy having a solidus temperature higher than the operating temperature of the furnace brazing process, the coating on the aluminum hair-pin tube or aluminum connector will not be compromised.

In one embodiment of the present invention, the metal or alloy coating on the aluminum tube or connector can be coated by an electroplating or an electroless process. The electroless process includes any chemical process, such as a chemical plating process that does not incorporate an electrical charge. For example, the aluminum tube or aluminum connector can be dipped into liquid metal or metal alloy. The metal or metal alloy will adhere to the aluminum. The longer the aluminum tube or aluminum connector sits in the liquid, the thicker the metal or metal alloy will be. In one embodiment of the present invention, the total thickness of the metal or alloy coating is in the range of 0.0001"-0.001". In another embodiment, the density of the metal or alloy coating is greater than 95% of the theoretical maximum.

The metal or alloy coating of the present invention reduces the galvanic corrosion of the heat exchanger. In addition, the favorable surface chemistry of the metal or alloy coating allows for more joining materials and/or processes to be used. The coating also offers notable protection to the aluminum tube during elevated joining temperatures.

The present invention also offers economic benefits when compared to mechanical methods of protecting against galvanic corrosion. The present invention has also demonstrated long-term reliability. The partially coated aluminum tube is flexible and has an improved ability to accommodate normal fit-up issues. Finally, the method of this invention provides a joint that is not subject to an accelerated rate of galvanic corrosion.

While the invention has been described in connection with certain embodiments, it is not intended to limit the scope of the invention to the particular embodiments set forth, but on the contrary, is intended to cover such alternatives, modifications, and equivalents as may be included within the spirit and scope of the invention as defined by the appended claims.

What is claimed is:

1. A method of forming a corrosion resistant aluminum-copper heat exchanger, the method comprising:
   providing at least one aluminum tube for conveying a pressurized fluid;
   providing at least one aluminum connector, having an exterior and an interior;
   at least partially coating one end of the exterior of the at least one aluminum connector;
   providing a cladding material for brazing the aluminum tube to the aluminum connector;

brazing the aluminum tube to the uncoated end of the aluminum connector in a controlled atmosphere brazing oven;

providing at least one copper tube;

providing a cladding material for brazing the at least partially coated end of the aluminum connector to the copper tube;

brazing the partially coated end of the aluminum connector to the copper inlet tube or copper outlet tube; and, wherein the coated end of the aluminum connector is coated with a metal having a higher solidus temperature than the brazing temperature used to braze the aluminum connector to the copper tube.

2. The method of claim 1, wherein the metal is selected from the group consisting of nickel, nickel alloy, chromium, and chromium alloy.

3. The method of claim 1, wherein the aluminum connector is coated by an electroless plating process.

4. The method of claim 1, wherein the aluminum connector is coated by electroplating.

5. The method of claim 1, wherein the thickness of the metal or metal alloy coating is 0.0001"-0.001".

6. The method of claim 1, wherein the density of the metal is greater than 95% of the theoretical maximum density of the metal or the density of the metal alloy coating is greater than 95% of the theoretical maximum density of the metal alloy.

7. The method of claim 1, wherein the copper tube is an inlet tube.

8. The method of claim 1, wherein the copper tube is an outlet tube.

9. The method of claim 1, wherein the heat exchanger is a plate fin type heat exchanger.

10. The method of claim 1, wherein the heat exchanger is finless.

11. The method of claim 1, wherein the heat exchanger is a microchannel type heat exchanger.

* * * * *